SORTING OF SIGNALS RECORDED ON A MAGNETISABLE SIGNAL CARRIER

Filed March 30, 1955 6 Sheets-Sheet 1

INVENTOR
Gerhard Dirks
BY Michael S. Striker
ATTORNEY

March 8, 1960 G. DIRKS 2,928,077

SORTING OF SIGNALS RECORDED ON A MAGNETISABLE SIGNAL CARRIER

Filed March 30, 1955 6 Sheets-Sheet 2

INVENTOR
Gerhard Dirks
BY Michael S. Striker
ATTORNEY

SORTING OF SIGNALS RECORDED ON A MAGNETISABLE SIGNAL CARRIER

Filed March 30, 1955 6 Sheets-Sheet 3

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

March 8, 1960 G. DIRKS 2,928,077

SORTING OF SIGNALS RECORDED ON A MAGNETISABLE SIGNAL CARRIER

Filed March 30, 1955 6 Sheets-Sheet 6

INVENTOR
Gerhard Dirks
BY Michael S. Striker
ATTORNEY

United States Patent Office 2,928,077

Patented Mar. 8, 1960

2,928,077

SORTING OF SIGNALS RECORDED ON A MAGNETISABLE SIGNAL CARRIER

Gerhard Dirks, Frankfurt am Main, Germany

Application March 30, 1955, Serial No. 498,045

Claims priority, application Germany October 1, 1948

10 Claims. (Cl. 340—174)

The present application is a continuation-in-part of my U.S. patent application, Serial No. 101,032, filed June 24, 1949, entitled "Electronic Office Machine With Computing, Indicating, Printing, Storing and Sorting Mechanism."

This invention relates to the sorting of signals recorded on a magnetizable signal carrier.

One object of the invention is to make possible the sorting of groups of signals representing a unit of information of a signal carrier comparable to the handling of punched cards, but with much more ease, at much less cost and in much smaller space.

According to the invention, a sorting device comprises, besides the devices for the sensing of the signal carrier to be sorted, devices for the recording on another signal carrier, which includes a controllable stepwisely actuable movement relative to transmission means, and wherein at the passage of the signal carrier containing the signals to be sorted, there are contained in the sorting columns signals whose values are defined by their position on the carrier, selected ones of these are compared after sensing, with signals represented by switching positions to determine sorting either by transfer of the whole group, or by erasure of a transferred group or by marking the carrier in a position ahead of the group to which the mark relates, and then sensing this mark to control selection for transfer to said other signal carrier.

Figure 1:
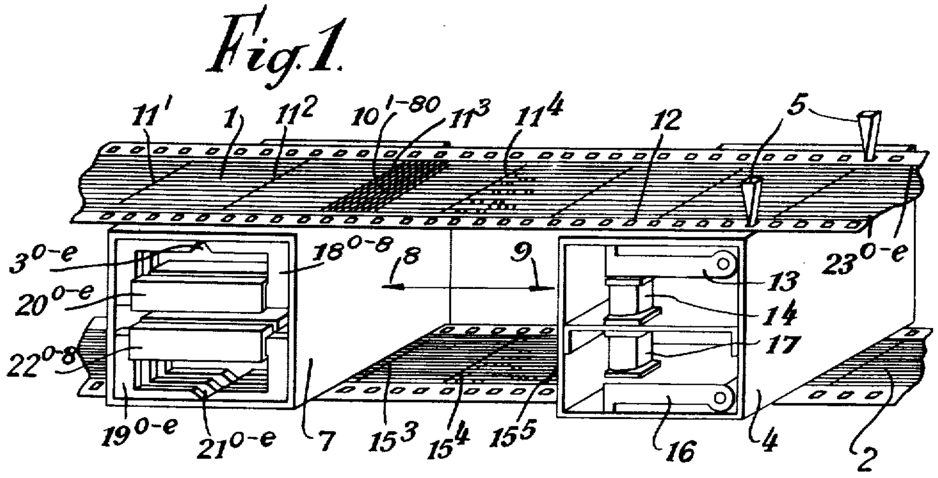
Fig. 1 is a perspective view of one means for effecting the step-by-step transport of two signal-carrying tapes and for the sensing and recording of signals thereon.

Fig. 1 shows in diagrammatic perspective the main parts of a two-tape sorting mechanism. It comprises two stepwisely operating tapes 1, 2 for the successive stepwise sensing and recording of signals thereon. Each tape system comprises a reel (not shown) from which the tape is uncoiled, a sensing head system $3^{0-e}$ by which the tape 1 is sensed, the tape feeding system 4 with stop teeth 5 and a reel (not shown) for rewinding the tape. The sensing and the transport systems are operated in dependence on the movement of the main shaft 6 (compare Fig. 2) driven by a motor (not shown).

The two-tape sorter may make superfluous the mechanical sorting of punched cards into ten boxes, by replacing a mechanical sorting of marked record means by the simple electric sorting of the signals themselves on to another tape in any desired new sequence of unities.

For a better understanding, the two-tape sorter is compared in the following with the function of a known punched card sorter. The successively stepwisely operated sections each containing a unity, i.e. a group of signals equivalent to a punched card of tape 1 are comparable to a series of punched cards which are fed through a slot of the punched card feeding mechanism of a sorter.

The tape 2 can be compared with the receiving pockets of a punched card mixing or sorting machine, into which the punched cards are delivered in dependence on which hole is sensed by the sensing brush within the vertical row selected for sorting. But there is a great difference between the two mechanisms. In the mechanically or electro-mechanically operating punched card sorters the sensed and fed punched cards are mechanically delivered with all their contents of information in the form of punched holes to one or another sorting box. With the two-tape sorter according to this invention no mechanical sorting of mechanical cards into boxes takes place. In this case the signals of the sensed "unity" of the successively step-wisely fed tape 1 themselves are electronically sensed and transferred to another tape under the control of a sorting signal in a sorting column selected from tape 1. With this invention any column within a unity may be used as a sorting column in a similar selective way as with punched cards.

Fig. 1 shows details of the signal-head system 7 and the tape feeding system 4 for the tapes 1 and 2.

The sliding-head system 7, in one cycle of the operating means, moves from right to left in arrow-direction 8 and back in arrow direction 9, by 80 denominations $10^{1-80}$ (width of one "unity" $11^3$ of the tape, each unity being equivalent to one punched card). The tape 1 may be stationary during the movement of the sliding signal head system 7 from right to left in arrow direction 8, and move by one "unity" to the right on the backward movement of the sliding signal-head system 7 in arrow direction 9. The movement of the tape by one "unity" 11 in arrow direction 9 is controlled by the upper part of the transportation control head 4 which similarly to the sliding signal-head system 7 moves to and fro by one "unity" from right to left and backward to right corresponding to a certain number of perforations 12. Beginning with the reversing point of the movement of the signal head and transport-system 7 and 4 in arrow-direction 8, and with the backward movement in arrow-direction 9, the lever 13 enters into the transport-holes of the tape, for instance hole 12, the tape meanwhile being in a fixed position, locked by the registering teeth 5. The magnet-coil 14 determines whether this stepwise transport is effected or not. The stepwise transport of tape 1 is not effected, if the magnet-coil 14 moves the transportation-lever 13 downwards by an energisation of its windings, and lever 13 cannot then grip into the transportation hole 12 of the tape 1.

The transport of tape 2 with its "unities" $15^1$, $15^2$ etc. is controlled by the lower part of the transport control mechanism (feeding control mechanism) 4. It consists, comparable to its upper part, of the transport-lever 16 and the magnet-coil 17. It can only feed the tape 2 from left to right in arrow-direction 9 by one "unity" 15, if the magnet-coil 17 does not prevent the lever 16 from gripping into a perforation hole.

The signal-head system, which moves to and fro in arrow-direction 8 and 9 within the sliding-head 7 comprises two sets of 15 signal heads $18^{0-e}$ and $19^{0-e}$ operating in parallel with their respective slots $3^{0-e}$ with coils $20^{0-e}$ and slots $21^{0-e}$ with coils $22^{0-e}$, of which each coil is co-ordinated to one of the tracks $23^{0-e}$. On the movement of sliding-signal-head system 7 to the left hand side, in arrow-direction 8, the magnetic signals within all the different tracks $23^{0-e}$ for one unity are sensed within one cycle and those in any column transversely of the tracks may be selected as a sorting column and the sorting signals within such column may be used for the selective control of the transfer of the sensed signals of all the columns of a unity on tape 2, for example during the backward movement of the sliding head system. Thus the signal head system moves over a unity whilst the tape remains stationary and this to and fro movement may be repeated.

The stepwise movement and the sensing of the stationary tape in all the columns of a unity within one cycle, enables the use of all the many control possibilities which a stepwise feeding of punched cards allows, without complicated intermediate storing systems.

The advantage of such a use of stepwisely moved magnetic tapes lies in the possibility of an easy recording and erasing, and a repeated sensing of signals in any selected signal position and sequence during e.g. one cycle, and very simple recording, erasing and feeding means, compared with punched card mechanism. Higher outputs can be achieved by simple means.

Instead of the sensing and recording being done by the moving of signal heads over a stationary tape the reverse arrangement may be adapted, which has other advantages, that the stationary signal heads give greater simplicity of construction.

The means for the selective operation of the sensing and/or recording means, and the means for transport of the tape are set forth in more detail in my co-pending application No. 498,048.

Figure 2:
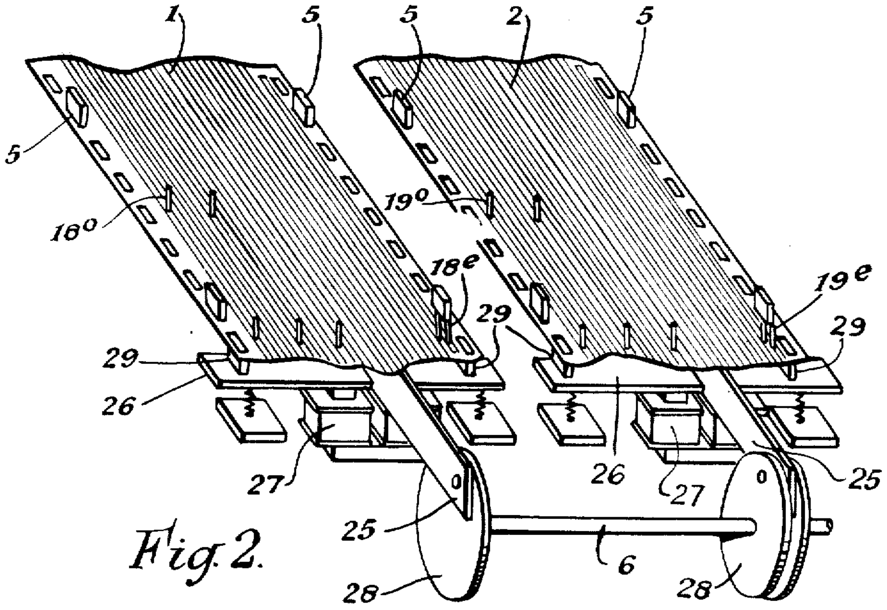
Fig. 2 is a fragmentary perspective view of an alternative means for the step-by-step advance of two tapes independently of each other, for the transfer of signals from a main tape to an auxiliary tape.

Referring to Fig. 2, there is shown the manner of stepwise feeding and the sensing and recording of two tapes controlled independently of each other. From the original tape 1, which is stepwisely fed, a transfer of all the signals of a unity is effected at the first passage to the second tape 2 only when the first tape contains, in a selected column, the selected sorting signal e.g. the digit value "0." At the same time, when such a transfer has taken place, the second tape 2 will be moved on by one step, as in this case the bar 25 with the feeder 26 is not fixed to the core of the magnet coil 27, and the rotating disc 28 on shaft 6, moving the to-and-fro transport system, can pull the tape forward by one step. After this forward movement the cross bar 26 with its cams 29 will be pulled out of the corresponding transport hole at the edges of the tape, whereupon such bar 26 is held fast by the magnet coil 27 during the rearward movement of the bar 25. Combined with the up and down movement of the cam 29 is the up and down movement of the stops 5, which have a slanted edge so that the tape receives by means of these stopping members 5, a definite position in which accurate sensings and recordings can be effected. The sensing and recording is effected by means of the sets of sensing, recording and erasing heads $18^{0-e}$ and $19^{0-e}$.

During the continuous stepping forward of the first tape 1, a transfer from its sensing coils $18^{0-e}$ to the recording heads $19^{0-e}$ of the next tape 2 can be effected only if at the selected column the selected sorting signal (e.g. the digit value "0") is contained during the first passage.

Figure 4:
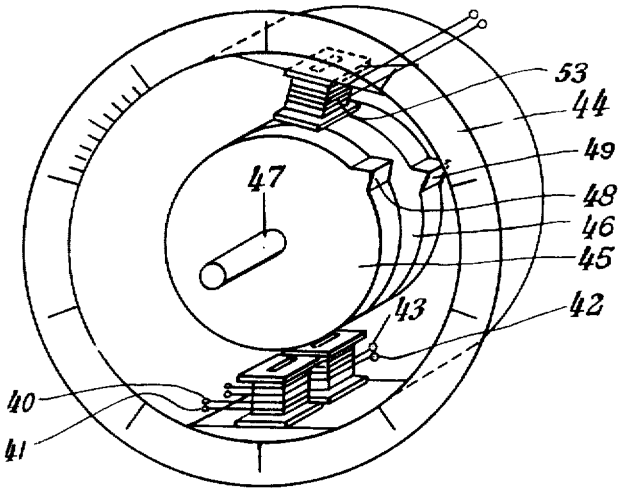
Fig. 4 is a perspective view of an inductive distributor described below.

The sorting may be done in either of two ways, namely, by transferring the whole content of a unity at each sensing operation and then erasing the new record if it does not contain the selected sorting signal in the sorting column, or by having a pre-sensing of the sorting column in a unity and then transferring the whole content of the unity only if such pre-sensing reveals the presence of the sorting signal in that unity. The latter method will be described first with reference to Fig. 3 and then the former method with reference to Fig. 4.

Figure 3:
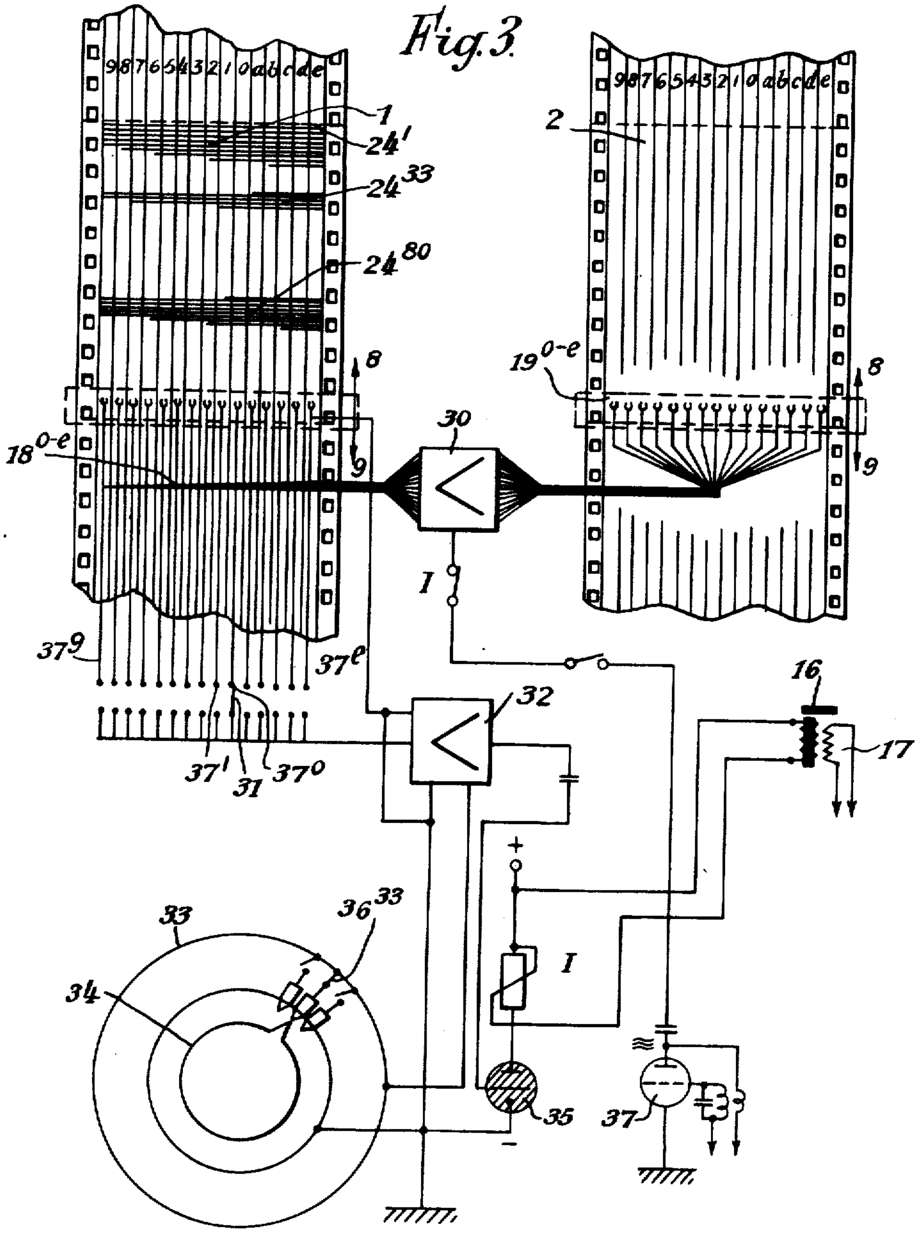
Fig. 3 is a wiring diagram illustrating a two-tape sorting mechanism according to the invention.

Fig. 3 shows the operation of a two-tape sorting device with tapes 1 and 2, by means of a diagram.

Above the tapes 1 and 2 move the signal head sets $18^{0-e}$ and $19^{0-e}$ in arrow directions 8 and 9. The sensing heads $18^{0-e}$ are connected with the amplifier 30 and via a selecting stepping switch 31 with the amplifier 32. During the movement of the signal heads in arrow direction 8 the signals of tape 1 are sensed by the set of sensing heads $18^{0-e}$ and the signals sensed from tape 1 may be transferred or not transferred after amplification in amplifier 30 with e.g. parallel channels for a recording by means of the recording heads $19^{0-e}$ on the tape 2 under the control of a selective mechanism. Such selective mechanism may e.g. comprise a selective device for sorting columns, a selective device for sorting digit-value signals or the like, a transfer switching device and a switchable feeding device actuated in dependence on control signals delivered from said selective devices. The selective device for sorting columns includes the amplifier 32, which is in-active in its normal position and only opened for a short period by the selective switch 33, including e.g. the inductive distributing switch 34 actuating the igniting of the discharge tube 35 selectively. By means of this selective switch the selection of the sorting column may be effective. The selecting switch 33 has as many ways 36 as there are columns in a unity on the tapes.

In Fig. 3 the switch $36^{33}$ is shown closed, which makes the windings of the inductive switch effective during the passage of signal heads $18^{0-e}$ over column $24^{33}$ which column was selected by the actuation of switch $36^{33}$ as the first sorting column of the columns $24^{1-80}$ for this phase or stage of the sorting process. The selected switch effects the ignition of the relay tube 35 at the passing of the sorting column $24^{33}$ of the magnetizable tape 1 below the sensing heads, said relay tube being switched-off again before the beginning of the passage of the signal heads $18^{0-e}$ over the next denomination areas (columns).

The selective device for sorting-digit-value signals includes the selective switch 31, which may be operated selectively for the digit values, e.g. 0–9 selectively, and in combination with the additional signals *a–e* also for alphabetic or the like. If for instance, during a first passage of the tape 1 below the sensing heads $18^{0-e}$ a transfer of all the signals of such unities from tape 1 to tape 2 is to take place, having in sorting column $24^{33}$ e.g. a "zero," this selection is effected by means of a double dependent-selection, namely a selected denomination number and a selected digit value.

If in the switch selective position $37^{0}$ for digit value "zero"—signals during the passing over the selected denomination (sorting column), a signal is sensed, representing "zero," a selective transfer of all the signals of the respective tape-unity-area from tape 1 or 2 as the transfer switching device including relay tube 35 is actuated opening the amplifier-channels 30 and there is also the magnet 17 actuated, which releases the lever 16, so that the transport of the tape 2 is effected by one unity.

If in the sorting column $24^{33}$ selected by switch $36^{33}$ there is sensed no digit value signal equal to the selected switch position, in this example switch position $37^{0}$, the amplifier 32 remains uneffective.

And no transfer via amplifier 30 occurs and no tape 2 transport occurs as the lever 16 of the transport system is drawn against the magnet 17.

Instead of a selected transfer or no transfer of signals also a general transfer via amplifier 30 may take place and a successive selected erasing as shown in this figure, wherein the erasing oscillator 71 is operated in dependence on switch 35 to selectively erase or not erase the recorded signals which have just before been recorded by a transfer of all the signals of this unity from tape 1 to tape 2.

The process of sorting according to rising or falling sequences of sorting numbers, characters or the like is operated in this two-tape sorter as described below. While tape 1 moves stepwisely, at the first running through of this tape for a sorting process for digits 0–9 in sorting column $24^{33}$, namely the sorting process for sorting digit value "0," which may be adjusted by position $37^{0}$ of switch 31 only those unities are transferred from tape 1 to tape 2 effectively, which have in the sorting column $24^{33}$ the digit value signal "zero," so that after the running through there are recorded on tape 2 all the signals of such unities having in sorting column $24^{33}$ the digit value "0." By an effective transfer or recording is meant one which has been made selectively or one which has been retained selectively after a general transfer or recording.

In succession to each effective recording a transport of the tape 2 is effected by one unity.

During this first running through the order of selection of tape 1 is continuously step-wisely transported and in the intermissions between the transport-movements the signal contents of the respective unities of the tape are transferred onto tape 2. If there had to take place an "effective" recording both tapes are transported on by one unity. If on the other hand the transfer had to be "uneffective" e.g. had to be erased afterwards, as there was no "zero" in column $24^{33}$ only tape 1 is moved on by one step, whereas tape 2 remains in its position and will be erased at the respective unity. At the end of the first passage, the tape 2 contains in a continuous sequence all unities of tape 1, which have in the example under discussion passage of tape 1 a zero signal in the column $24^{33}$.

In the second passage of tape 1 the transfer of all the signals of such unities, which have in the selected column $24^{33}$ the signal "1" is effected as the stepping of switch 31 from position $37^{0}$ to $37^{1}$ has been switched, preferably automatically, after the termination of one "running through" of tape 1. In the same way as described above the sorting process takes place by stepwise transfer from tape 1 to tape 2 of all the signals of such unities which, at the third "running through," contain at the sorting column $24^{33}$ the sorting signal "2," at the fourth "running through" the sorting signal "3," etc. After the terminating of ten "runnings through" of the tape, the tape 2 contains in successive sequence all the unities of the tape 1 in a rising or falling sequence according to the selected sequence of digit values in the selected sorting column.

Comparably to punched card sorting the next sorting column will be selected afterwards, e.g. column $24^{32}$, by switch $36^{32}$ to transfer any wanted sequence of sorting numbers in all the respective unities on to tape 2.

In the devices described up to now the sorting was effected by the transfer of unities to a sorting tape by transfers which "have been made effective" either during the movement of the tape after the signals have been sensed from a stationary tape, or transferring all signals and sensing a sorting signal, and during the movement of the tape, erasing all those transferred signals not selected by the sorting signal.

The transfer can be effected in such a way, that in the preceding sensing process the digit value of the sorting column is sensed and used for selecting. In dependence on the result of this use of the signal in a second sensing process, the whole unity is sensed and in a given case transferred onto the respective sorting tape. It is in this process possible to effect the sorting by two sensing processes, which are effected simultaneously, of which the one is locally pre-arranged in one unity from the other. On the other hand, the sensing processes can be effected by the same signal head successively after each other. The pre-marking signals for the effecting of the transfer at the next sensing may be either stored in relays or electronic tube storages or the like, or on the tapes themselves.

Such a sorting device, which effects the sorting process at the transfer from a sorting tape 1 by means of two sensing processes is described in the following with reference to Figs. 4–7.

Figure 6:
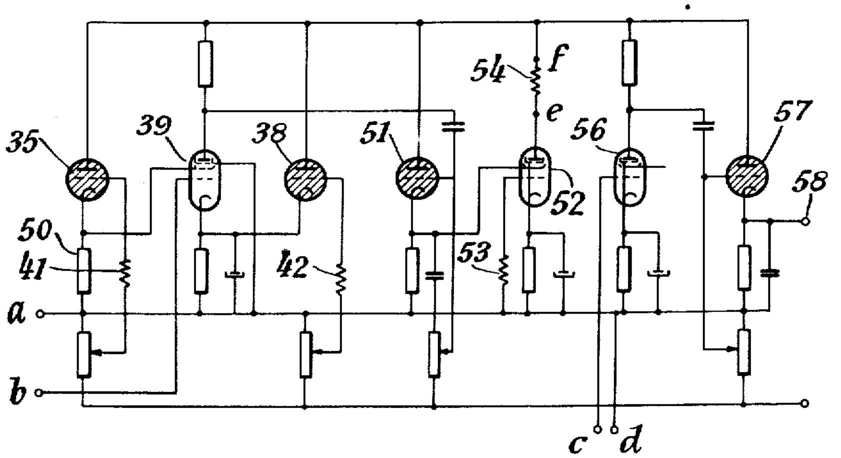
Figs. 5–7 are views illustrating the sensing of signals successively by the same signal heads, with means for storing pre-marking signals for a sort transfer indication command.
Figure 5:
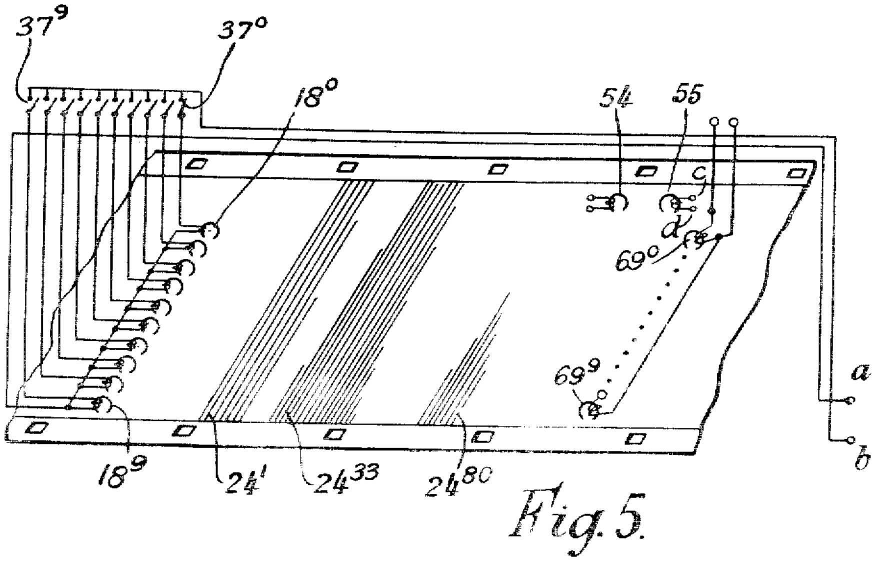

In Fig. 5 the sensing heads $18^{0-9}$ are shown, which introduce signals via the switches $37^{0-9}$ in a selectable way via the connection ways *a*, *b*, to the electronic selecting gate comprising the discharge tubes 35 and 38 and the pentode 39 of Fig. 6.

The sorting column according to which the sorting is to be effected, is selected by means of the coils 40/41 and 42/43 by a rotational adjustment of the circle 44. The circle 44 carries a scale, which indicates in which sorting column the coils 40/41 and 42/43 are to be effective. The circle (see Fig. 4) carries a scale which indicates in which sorting column the coils 40/41 and 42/43 are to be effective. Discs 45 and 46, which are provided on the main shaft 47, have two yokes or jacks 48 and 49, the edges of which pass closely over the edged cores of the said coils 40/41 and 42/43.

If the primary winding 40 of a coil is excited by means of direct current, the gas discharge tube 35 is ignited at the passing of the yoke 48 over the core of that coil, since the secondary winding 41 of this coil is connected with the control grid of the gas discharge tube 35. The ignition of the gas discharge tube 35 effects an opening of pentode 39, as the cathode resistance 50 of the gas discharge tube delivers the screen grid voltage of the pentode as a voltage drop.

After an interval of almost one column, the yoke 49 of disc 46 passes the core of the coils 42 and 43, and the gas discharge tube 38 is ignited which closes the pentode 39 by making the cathode potential positive in relation to the potential of the suppressor grid.

By way of introductory explanation it may be mentioned that after a sorting column has been selected, it must be ascertained whether the digit value (if any) in the selected column operative for this tape passage, and such digit value must be recorded as a pre-mark for the next sorting stage. This recording may be done either in an electronic storage e.g. electronic tubes or on the tape itself. The latter alternative is illustrated diagrammatically in Fig. 5, and in further detail in Fig. 7.

In Fig. 5 the principle of operation is shown for the first running through of the tape, switch $37^{0}$ is closed, so that the digit value 0 is used as selecting value. The further selecting according to other selecting values may be done with the same arrangement of means by further running through of tape 1 and a step-wise change of the selective switching position of switch $37^{0}$ to position $37^{1}$, $37^{2}$ etc. for e.g. the successive digit values 0–9.

In the drawing, the control grid of pentode 39 is connected only with that one of the sensing heads $18^{0-9}$, which is switched on via the corresponding switch $37^{0-9}$ (i.e. in the case shown the switch $37^{0}$) only those signals can be made effective via the pentode 39, which corresponds both to the selected column as determined by the position of the coils 40/41 and 42/43 (e.g. column $24^{33}$) and to the switched-on of sensing heads $37^{0-9}$ (e.g. in the case shown, signal head $18^{0}$).

If such a signal is sensed from a selected column, it ignites the gas discharge tube 51 via the pentode 39 (opened only during the passing of this column $24^{33}$) and opens the pentode 52, the control grid of which is connected with secondary winding 53 while in the plate circuit of that pentode the recording coil 54 is arranged.

By this means, an indicating mark is stored in the first or other preceding columns of the same unity, indicating that the signals of this unity must be transferred to sorting tape 2 at the next sensing and transfer stage. In Fig. 5 the tape moves from left to right.

By this process a relatively high speed of the tape can be attained, as the movement of the tape can take place during the backward movement of the feeding systems. By means of this pre-marking for the effecting of a transfer, this transfer can be effected directly, without the making of ineffective transfers which later have to be erased. This pre-marking signal is sensed by means of the signal head 55, which is connected with the control grid of the pentode 56 via the switching ways *c, d*. The amplified signal effects the ignition of gas discharge tube 57, opening the respective switches connected to the respective cathode circuits at 58 determining whether a transfer of the signals of the unity to tape 2 is to take place or not.

Figure 7:
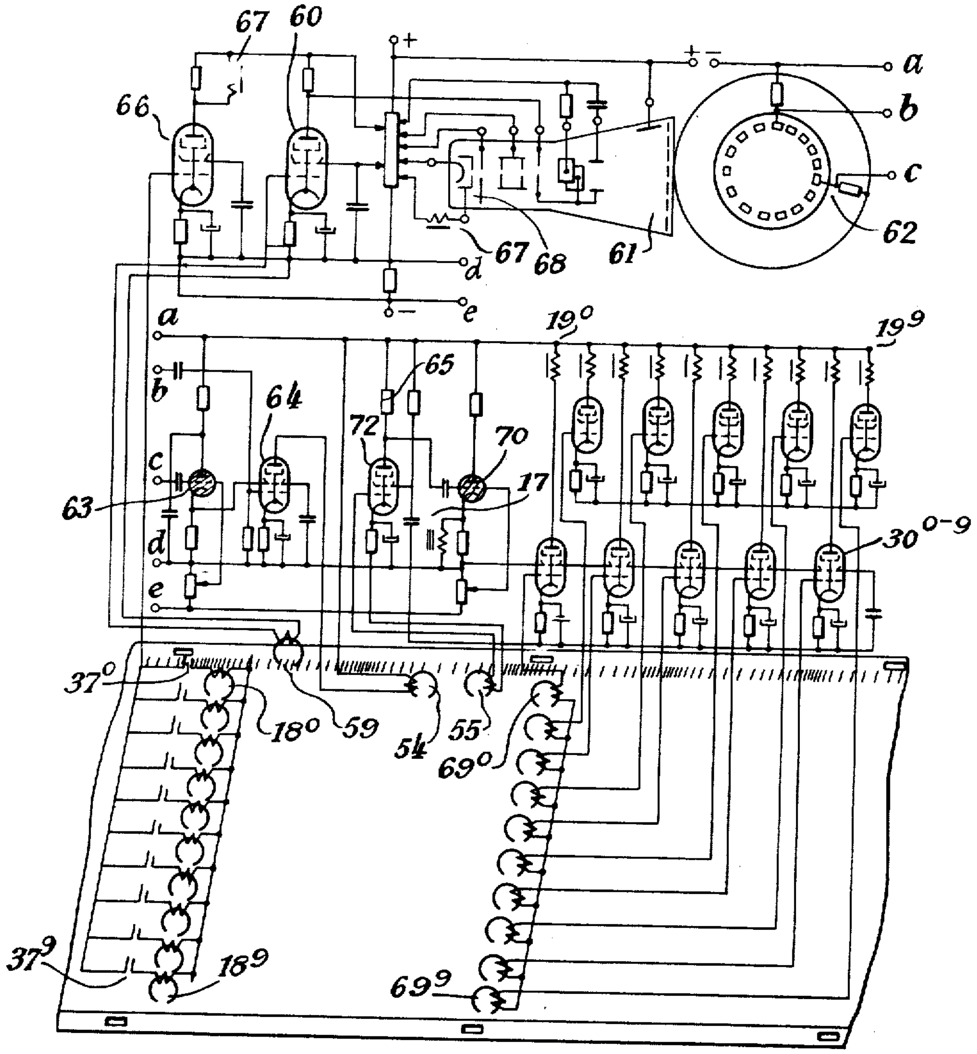

If instead of the inductive distributor there is provided a cathode ray distributor for the selection of the column and/or digit values, an arrangement can be used according to switching diagram of Fig. 7. The sorting process itself is almost the same as has been described in connection with Figs. 4–6.

In the example illustrated, and in contrast to Fig. 5, an additional sensing head 59 develops a sine wave signal which effects via the co-ordinated pentode 60 and a phase-shifting device the circular rotation of the cathode ray in the electronic distributor 61. The column according to which the sorting is to be effected, is indicated by the connection of the high-ohmic resistance 62, which may be one of a plurality arranged for selection of the respective sorting columns, and which ignites the gas discharge tube 63, when the sorting process is to take place. The gas discharge tube opens the pentode 64, which takes its screen grid voltage as a voltage drop at the cathode resistance of the discharge tube 63. The pre-marking signal itself, which indicates that the transfer is to be effected, is recorded by means of the recording head 54. Sensed by signal head 55 and amplified by pentode 72 it will release at the high-ohmic resistance 65 a surge igniting gas discharge tube 70. Only those of the signal heads $18^{0-9}$ can be made effective via the cathode ray distributor, which give signals on to the control grid of the pentode 66 via a closed switch $37^{0-9}$. On this feature compare the description of Fig. 5.

In the plate circuit of the pentode 66 is arranged the transformer 67, which transfers the signals sensed by the one of the sensing heads $18^{0-9}$ made effective by a closed one of the switches $37^{0-9}$ to the control grid 68 of the cathode ray tube 61 and thereby controls the intensity of the cathode ray. A transfer on to the second tape from the sensing heads $69^{0-9}$ via the coordinated pentodes $30^{0-9}$ to the recording heads $19^{0-9}$ of the other sorting tape is only effected, if at the beginning of the sensing of a unity, the gas discharge tube 70 is ignited, by a pre-marking signal, which had been recorded on the tape 1 and sensed by the sensing head 55 and amplified by pentode 72.

After each sensing process of the tape 1 this tape is moved forwards by one unity by means of the transport system. The tape to which the signals have been transferred is moved on by one unity as described above. The control of the transport system is also effected by the discharge tube 70, controlling the tape transport system via magnet 17.

In the same way the series of signal heads $18^{0-9}$ and $69^{0-9}$ may be replaced each by one signal head if electronic distributor means or the like is used, operating in dependence on signals in the synchronizing track sensed by signal head 59, for determining numerical values on a basis, related to fixed points on the tape.

Figure 8:
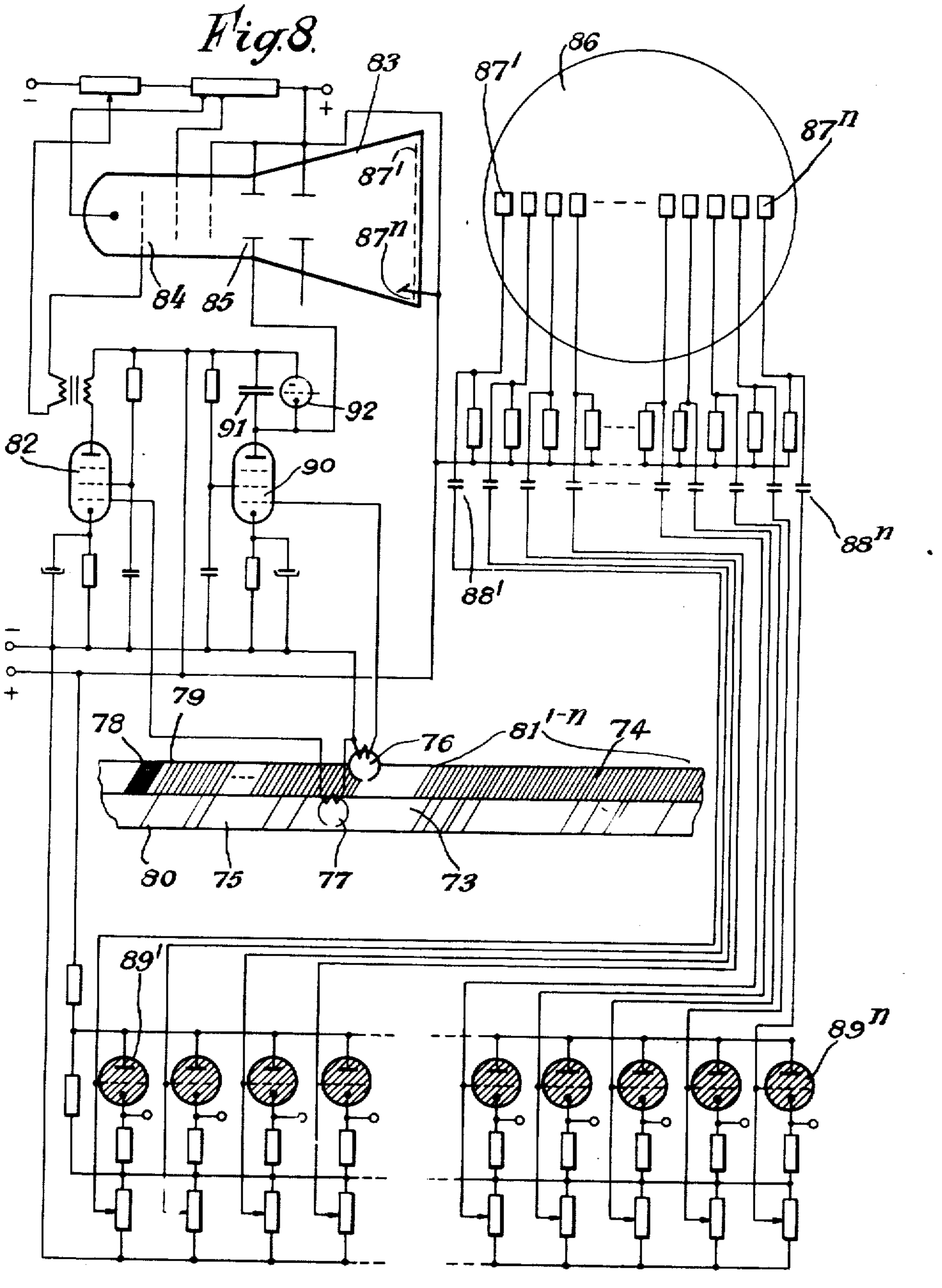
Fig. 8 is a switching diagram for the control of a set of relay tubes by a stepwisely movable tape or other record means having one synchronization and one information track.

Fig. 8 shows by means of a switching diagram the control of electronic relay tubes in dependence on information signals contained in one track 75 of a magnetizable tape. Synchronizing signals are contained in another track of that tape and they are contained within the synchronizing track 74. Such synchronizing track may be preferably a second magnetizable track on such tape or constant optical synchronizing marks or the like.

In the arrangement of Fig. 8 is shown a magnetizable tape having one information track 75 sensed or recorded in dependence on signal head 77 and a magnetizable synchronizing track 74 in which the signals are sensed or recorded by means of signal head 76. The arrangement is shown operative for sensing. The synchronizing track 74 contains magnetized areas the beginning of which may be indicated by a start signal 78 and the ending of such unity of an area may likewise be indicated by a stop signal (not shown), which would be situated at the right hand side of the tape shown in this figure.

Such synchronizing signals for start and stop may be used in the way of start and stop signals in teleprinting systems. The start signal may be either the interruption of a constant recording of a frequency or an amplitude modulated signal or the like of a distinguished amplitude differing from the following signals for the synchronization.

The arrangement according to Fig. 8 is to show as an example the recording of signals on a tape being comparable as to its effect to a punched card. Each unity of the tape beginning at start signal 78 on the left side and ending at the not shown stop signal on the right side is to contain all the signals of a punched card e.g. an eighty column punched card. Further on the arrangement is shown in such a way that a linewise operation in which comparably to the sensing of punched cards in tabulating machines there are at first sensed all the columns within one horizontal digit value row, e.g. a punched card, digit value row "9." After the sensing of all the columns of the horizontal digit value row "9" follows the sensing of all the columns within the horizontal digit value row "8," then follows horizontal row "8" and so on, when the punched card would be moved further below sensing brushes. To demonstrate a comparable effect and the operation between information signals and synchronizing signals there is shown in Fig. 8 within the area $79^{1-n}$ an arrangement of synchronizing signals for each one column and wherein the whole group of columns 79 corresponds to the line "9" of a punched card. Instead of holes which would be used at punched cards information signals 80 in the information track of the tape are co-ordinated to that synchronizing signals 79 which correspond to the column in which a hole would be punched in a punched card. In Fig. 8 such information signals 80 are contained within the column $79^2$, $79^9$, $79^{11}$ etc. of track 75 indicating that a "9" is to be computed, printed and so on within the columns 2, 9, 11 and so on as the sub-area of the unity of the tape synchronized by synchronizing signals $79^{1-n}$ would be comparable to the lowest horizontal row of a punched card "9."

After a space 73 in which no information signals will be recorded and which corresponds to the moving on of a punched card from one horizontal row to the following horizontal row, e.g. the horizontal row "8" of a punched card, the synchronizing signal area $81^{1-n}$ is to control the local or timed position of information signals within track 75 adopted to represent an "8" in all those columns, wherein signals within this row have a defined position to the respective synchronizing marks. In this case signals for the digit value "8" are shown in columns 4, 6 and so on.

The length of such a tape unity, which corresponds with its two tracks to the marking of signals in a punched card, may be eight inches, so that each sub-area $79^{1-n}$, $81^{1-n}$ and so on will have a length of three quarters of an inch in those cases, if an arrangement of 12 horizontal lines of a punched card is to be represented in a lengthwise arrangement of a magnetizable tape. The whole unity of that tape may therefore contain about 10.000 wave lengths or pulses if the usual subdividing used at sound frequency will be used for recording. In order to secure an undisturbable reproduction there may be used a series of wave lengths for instance ten wave lengths or pulses to represent one information signal 80 and the like. As a punched card of 80 columns has within 12 horizontal rows only the possibility to represent 960 different markings, the same effect may be obtained by a magnetizable tape with two tracks each track having a width of about 1/10 to 1/20 of an inch and a length of 8 inches, if a tenfold security is used for indicating one signal. Such security may be obtained by using only the integral of a plurality of wave lengths or pulses as indication for a mark instead of single wave lengths or single pulses.

It is a special feature of this invention that by the use of synchronizing signals co-ordinated to indicate the position of information signals for columns on digit values, a stepwise transport of such tape may be effected without losing the advantage of using synchronizing signals.

The operation of the sensing arrangement is shown in Fig. 8 with electronic distributing means being controlled by the signals in the synchronizing track 74. The sensing head 76 for synchronizing signals is operatively connected with the control grid of pentode 90 which will deliver current pulses when opened by signals sensed from the synchronizing track 76. The capacitor 91 receives therefore pulses enlarging its voltage and deflecting a cathode ray from position $87^1$ to $87^n$ on screen 86 from position to position. There may be an eightyfold electronic switch or there may be used a tenfold electronic switch used repeatedly eight times within eighty columns, if group switching means are used being operative in dependence on the transgression of each tenth group field. The discharge tube 92 is to discharge the capacitor 91 after each cycle of deflection.

In the example of Fig. 8, discharge relays $89^1$ to $89^n$ e.g. 80 discharge relays are to be controlled by the information signals within track 75. At the passing of the information signals below sensing head 77 such signals are amplified in pentode 82 to deliver control signals for the electronic switch 83 to control its control grid 84. If for instance information signal 80 in column 2 of the synchronizing area $79^{1-n}$ but in track 75 is sensed by signal head 77 the cathode ray deflected by the deflection system 85 has reached the field $87^2$, so that the amplified information signal delivered to control grid 84 effects via coupling capacitor $88^2$ the ignition of discharge tube $89^2$, whereas the preceding relay tube $89^1$ remains uneffective as within this column no information signal 80 has been sensed. After the running through of the tape through the information area synchronized by the synchronizing signals $79^{1-n}$ all those electronic relay tubes $89^{1-n}$ are effective which correspond to the said columns 2, 9, 11 and so on in which information signals are cotnained to indicate "9," as this area of the tape synchronized by the signals $79^{1-n}$ is to contain all the signals for the digit value "9."

Within the intermittence 73 the electronic tubes $89^{1-n}$ are switched back to their starting position so that within the sub-area of the tape synchronized by the signals $81^{1-n}$ those of the relay tubes $89^{1-n}$ may be effected anew which correspond within this sub-area to information signals representing digit values "8" and so on.

The signals of the distributor 86 may be sorted as in Fig. 7, each element 87 representing a particular denomination and the inductive distributor of Fig. 5 or the electronic one of Fig. 7 used to select the value period, i.e. a unique position in each unity or group is examined on each passage to determine sorting as described with reference to Fig. 7. The signals may be read out to value storage for operating parallel machinery such as printers or may be recorded on a tape serially similarly to the data tape tracks 74 and 75.

The illustrated examples of transport devices, recordings, sensing, storing, re-arranging and sorting devices set forth advantages which can be achieved in the recording of information of any kind. As a further great advantage it may be metnioned, that the storing capacity of such a tape is very great. The contents of whole punched card filing systems may be recorded on one tape. To the advantage of the saving of space, can be added the further advantages of lower production costs as well as the lower weight and size of the apparatus and the very easy handling of the reels compared with the handling of punched cards. The possibilities of operating with the stored information are especially advantageous over the use of mechanical symbol carriers, because the recorded information may be erased and the recording tape used again. Finally, by electronic operation of the signal carriers the highest operation speeds can be achieved.

What I claim is:

1. In an apparatus for sorting data recorded as groups of data signals in one order of groups on a data tape, by moving said data tape in repeated passages past sensing means, into a different selected order of groups by recording the same on a second magnetizable tape, said data signals each having an assigned value defined by its respective position on said data tape, in combination, first transport and sensing means for said data tape; second transport and recording means for said second tape; settable means for selecting, for different passages of said data tape, a different value denoting position of said data signals for using said signals in the selected position as sorting signals; circuit means for connecting said sensing and recording means; and means operable by said sorting signal for controlling the transport of said second tape and the operativeness of said circuit means connecting said sensing and recording means so as to transfer each group of signals containing a selected sorting signal and to cause said second tape transport means to advance said second tape a distance corresponding to one group of signals for each group transferred.

2. In a sorting apparatus for sorting groups of tape-recorded signals from a random order into a desired sequence, in combination, a magnetizable data tape having signals recorded in groups, each signal having an assigned value defined by its respective position on said tape; first transport and sensing means for said data tape; said data tape and said sensing means being movable relatively to each other; a second magnetizable tape; second transport and recording means for said second tape, said second tape and said recording means being movable rleatively to each other; circuit means for connecting said sensing and recording means; selecting means operable in synchronism with the relative movement of said first tape and switchable for successively selecting different positions of said signals within a group to be sorted for each different passage of said data tape relatively past said sensing means; and means controllable in relation to each sensed and selected sorting signal for effectively transferring the whole group associated therewith to said second tape by rendering said circuit means between said sensing and recording means effective and for controlling the transport of said second tape a distance corresponding to the tape-portion occupied by one group in the direction of transport, for each effective transfer.

3. Apparatus as claimed in claim 2 including erasing means associated wtih said second tape, and in which every passage of said data tape relative to said sensing means constitutes one cycle of operation, said sensing and recording means being operable for causing every group of signals sensed on said first tape to be recorded on said second tape in each first half cycle of operation during a passage of said first tape, said erasing means being capable of erasing from said second tape each recorded signal in each second half cycle of operation, and means controllable by a respective selected sorting signal being provided for inhibiting said erasure.

4. Apparatus as claimed in claim 3 in which the said sensing and recording heads are reciprocatingly movable so as to sense and record whilst said first and second tapes are stationary.

5. In a sorting apparatus for sorting groups of tape-recorded signals from a random order into a desired sequence, in combination, a magnetizable data tape having signals recorded in groups, each signal having an assigned value defined by its respective position on said tape; first transport and sensing means for said tape; a second magnetizable tape; second transport and recording means for said second tape; circuit means for connecting said sensing and recording means; selecting means operable in synchronism with the movement of said first tape past said sensing means and switchable for successively selecting different positions of said signals within a group to be sorted for each different passage of said data tape past said sensing means; and means controllable in relation to each sensed and selected sorting signal for effectively transferring the whole group associated therewith to said second tape by rendering said circuit means between said sensing and recording means effective and for controlling the transport of said second tape a distance corresponding to the tape-portion occupied by one group in the direction of transport, for each effective transfer; said selecting means comprising an inductive distributor having a signal distributing means positionable at any of a plurality of positions to select corresponding sorting signals.

6. In a sorting apparatus for sorting groups of tape-recorded signals from a random order into a sequence, in combination, a magnetizable data tape having signals recorded in groups, each signal having an assigned value defined by its respective position on said tape; first transport and sensing means for said tape; a second magnetizable tape; second transport and recording means and transport means for said second tape; circuit means for connecting said sensing and recording means; selecting means operable in synchronism with the movement of said first tape past said sensing means and switchable for successively selecting different positions of said signals within a group to be sorted for each different passage of said data tape past said sensing means; and means controllable in relation to each sensed and selected sorting signal for effectively transferring the whole group associated therewith to said second tape by rendering said circuit means between said sensing and recording means effective and for controlling the transport of said second tape a distance corresponding to the tape-portion occupied by one group in the direction of transport, for each effective transfer; said selecting means comprising an inductive distributor capable of distributing to different channels the signals corresponding to different signal positions, and a plurality of switches respectively associated with said selectable positions.

7. In a sorting apparatus for sorting groups of tape-recorded signals from a random order into a sequence, in combination, a magnetizable data tape having signals recorded in groups, each signal having an assigned value defined by its respective position on said tape; first transport and sensing means for said tape; a second magnetizable tape; second transport and recording means and transport means for said second tape; circuit means for connecting said sensing and recording means; selecting means operable in synchronism with the movement of said first tape past said sensing means and switchable for successively selecting different positions of said signals within a group to be sorted for each different passage of said data tape past said sensing means; and means controllable in relation to each sensed and selected sorting signal for effectively transferring the whole group associated therewith to said second tape by rendering said circuit means between said sensing and recording means effective and for controlling the transport of said second tape a distance corresponding to the tape-portion occupied by one group in the direction of transport, for each effective transfer; and said selecting means including means for being synchronized by signals recorded on the data tape, and second sensing means for sensing said signals and for operating said synchronizing means by said sensed signals.

8. Apparatus as claimed in claim 7 in which said selecting means comprises a cathode ray tube whose time base is controlled by said signals operating said synchronizing means.

9. In an apparatus for sorting data recorded magnetically on a data tape as groups of signals, each signal having an assigned value defined by its respective position on said data tape and for selectively transferring said data in a plurality of passages of said tape to a second magnetizable tape, in combination, separate transport means for each tape; first sensing means for said data tape; recording means operatively connected with said sensing means and cooperating with said second tape; second sensing means for said first tape adapted to sense signals at least a group ahead of said first sensing means; means connected to said second sensing means for selecting a particular sorting signal in each group for one passage of said data tape past said first sensing means, and a different sorting signal on different passages; recording means to record on said data tape ahead of the group to which the signal belongs a pre-mark; means for rendering the connection between said second tape recording means and said first tape sensing means effective to transfer the whole group to said second tape and for controlling the advance of said transport means; and third sensing means for sensing said pre-mark and for controlling said means controlling said advance of said transport means.

10. In an apparatus for sorting data recorded in a magnetizable data tape by groups of signals whose value is defined by their respective position on said tape, said tape having said signals recorded in a single track and having synchronizing signals for each possible position recorded in a separate synchronizing track; first transport and sensing means for said data tape; means for selecting one position in each group as a sorting signal; means for setting said selecting means for selecting different positions on different passages respectively of said data tape; a second magnetizable medium; second transport and recording means; means for detecting a selected sorting signal and for thereby controlling said second transport and recording means so as to transfer each group containing a selected sorting signal in turn to successive group positions on said second medium together with said synchronizing signals.

References Cited in the file of this patent

UNITED STATES PATENTS

| | | |
|---|---|---|
| 2,587,532 | Schmidt | Feb. 26, 1952 |
| 2,617,704 | Mallina | Nov. 11, 1952 |